Jan. 14, 1958 J. L. REINARTZ 2,820,194
APPARATUS FOR MEASURING ELECTRICAL CHARACTERISTICS
Filed Nov. 18, 1953
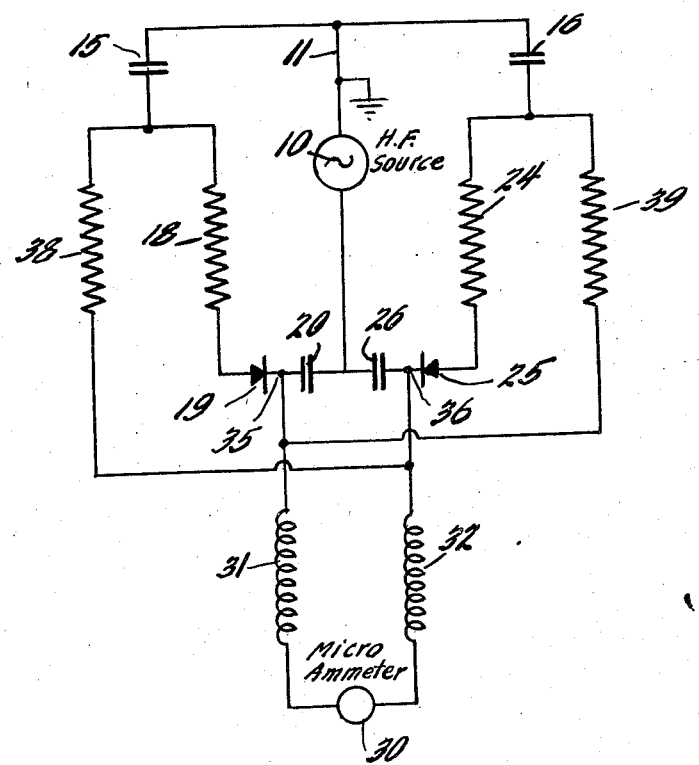
INVENTOR
John L. Reinartz,
BY Watson, Cole, Grindle & Watson
ATTORNEYS 2,820,194
Patented Jan. 14, 1958

2,820,194
APPARATUS FOR MEASURING ELECTRICAL CHARACTERISTICS

John L. Reinartz, Burlingame, Calif., assignor to Eitel-McCullough, Inc., San Bruno, Calif., a corporation of California Application November 18, 1953, Serial No. 392,815

6 Claims. (Cl. 324—57)

This invention relates to improvements in measuring apparatus for accurately determining the characteristics of electrical elements, and more particularly to improved electrical networks for comparing electrical elements of unknown characteristics with similar electrical elements of known characteristics. It is an object of the invention to provide an electrical network or bridge circuit whereby comparison of circuit elements or components of known and unknown values may be rapidly effected, preferably at a speed commensurate with the speed of production.

In the manufacture of circuit components, whether of capacitive, inductive, or resistive nature, it is essential to determine whether the value of the component falls within a range of values which can be employed effectively; this is often of more importance than the determination of the exact value of the component. Furthermore, electrical components for use in high frequency circuits should be tested at frequencies of the order to which they will be subjected in service.

This is obviously true where the characteristic of primary importance is capacitance or inductance, and is equally true in measuring the resistance of a conductive element in which, at high frequencies, current flow tends to follow the conductor surface. Thus an element designed for high frequency use, found to have a desired value when tested at low frequency, will not necessarily function satisfactorily at the high frequency encountered in service.

It is therefore a more specific object of the invention to provide a measuring or comparing circuit in which the deviation of the signficant value of an electrical element from the optimum value at a frequency of the order to which it will be subjected in use may be quickly determined.

A further object of the invention is the provision of a bridge type electrical network comprising two generally equivalent circuits, one circuit including an element of known characteristic and the other circuit including an element of unknown characteristic, a source of radio frequency energy applied across each of the circuits, a rectifier in each circuit, and a direct current meter to which the rectified currents from the two circuits are supplied in opposed relation, whereby the differential current flowing through the meter affords an indication of the extent of deviation of the value of the element of unknown characteristic from that of the element of known characteristic.

Further objects and features of the invention will be apparent from the following description, taken in connection with the accompanying drawing, in which the single figure is a diagrammatic representation of a measuring circuit embodying the principles of the invention.

In order to facilitate an understanding of the invention, reference is made to the illustrated embodiment and specific language is employed to described the same. It will, nevertheless, be understood that no limitation of the scope of the invention is thereby intended, various alterations and further modifications being contemplated such as would normally occur to those skilled in the art to which the invention relates.

Thus, referring to the drawing, there is shown a source of radio frequency energy 10, which may be of any conventional design, and is preferably constituted by a crystal controlled oscillator of 2 to 5 watt output at a frequency comparable to that which will be applied in use of the element to be measured, for example 1 to 10 megacycles, the source being grounded at one side as indicated at 11. The signal generated by source 10 is applied across each of two circuits, or of two arms of a circuit; an element or component 15 of known value, hereinafter referred to as the standard element, is included in one arm and the element 16 of similar design of which the value is unknown, is included in the other arm.

The invention finds its principal application in measuring the value of elements of which the significant characteristic is the capacity, and is especially useful in measuring the interelectrode capacity in vacuum tubes and the like. Elements 15 and 16 are therefore represented as condensers in the drawing, but it will be understood that inductors and resistors may similarly be measured or compared. Further, the testing or comparing of units of more complex nature to determine the impedance, reactance or other characteristics thereof is contemplated.

In series with the standard element 15 in the first arm of the circuit is a resistor 18, a rectifier 19, and a condenser 20. In series with the element 16 of unknown value in the second arm of the circuit is a resistor 24, a rectifier 25 and a condenser 26, corresponding elements in the two arms preferably having identical values. By way of example, but not by limitation, resistors 18 and 24 may comprise 1000 ohm carbon or composition resistors of ½ watt rating, rectifiers 19 and 25 are preferably germanium diodes, such as the 1N52 diode, or vacuum diodes of the 201C type, and condensers 20 and 26 may be 0.01 microfarad silver mica capacitors.

A meter 30, responsive to direct current, for instance a sensitive micro-ammeter, preferably of the zero center type provided with a scale reading of 25 microamperes at each side of the zero point, has its terminals connected through radio frequency chokes 31, 32, for example choke coils of the order of 2½ millihenry value, to the respective arms of the measuring circuits, preferably at points 35 and 36 intermediate the rectifier 19 and condenser 20 in the first arm, and the rectifier 25 and condenser 26 in the second arm. The point 36 in the second arm is also connected through resistor 38 to the standard element 15 in the first arm, and the point 35 is likewise connected through resistor 39 to the element 16 of unknown value. Resistors 38 and 39 are of equal value, preferably the value of resistors 18 or 24.

It will be appreciated that when an element 16 to be measured is positioned in the circuit as shown, and the source 10 is generating a radio frequency current of the order desired, the current flow will follow the path including, in the one arm, the standard element 15, resistor 18, and rectifier 19, producing at 35 a pulsating direct current. Similarly, current will flow in the other arm through element 16, resistor 24, and rectifier 25, producing at 36 a pulsating direct current. If the values of 15 and 16 are equal, the mean potentials at 35 and 36 will be equal, and no current will flow in the meter 30, which will give a zero reading, indicating precise conformity of the unknown element 16 with the standard element 15. If the value of 16 varies from the value of 15, the mean potential developed at 36 will correspondingly differ from that at 35, with the result that the meter 30 will be deflected in one direction or the other, indicating the extent and direction of the divergence in values of the elements 15 and 16.

The radio frequency chokes 31 and 32 prevent short circuiting of the radio frequency energy by the meter and protect the meter against damage. Capacitors 20 and 26 block the return of rectified current to the source.

from the points 35 and 36, and resistors 18 and 24 protect the rectifiers 19 and 25 respectively from the effects of excessive current flow. Resistors 38 and 39 complete paths for radio frequency energy through the condensers and the elements being compared. Accumulation of a residual charge on condensers 20 and 26 respectively is prevented by continuous draining of any charge through resistors 38 and 39, so that elements 16 to be measured may be introduced in the circuit in rapid succession for the taking of successive readings.

Since it is usually sufficient merely to compare the unknown element with the standard element, for the purpose of determining whether the former has a value deviating excessively from the value of the latter, the meter may initially be calibrated by selecting for the element 15 one which has the optimum value, and comparing with it in succession elements 16 having known values respectively higher and lower than the optimum value, and representing the limiting values which may be tolerated. The reading of the meter in each instance is noted, and the scale may be marked to show the two extreme positions. Thereafter, on the testing of successive elements, those causing a deviation of the meter beyond the marking at either side may be rejected, while those giving a less deviation, and falling within the predetermined range of values, are acceptable for use.

While I prefer to use frequencies of the order to which the tested element will be subjected in use, it will be appreciated that, in general, the higher the frequency of the source energizing the test circuit, the greater the sensitivity of the measurement. I may, therefore, employ for the purpose frequencies much higher than the suggested range of 1 to 10 megacycles.

Having thus described the invention, what is claimed as new and desired to be secured by Letters Patent is:

1. In apparatus for comparing an electrical device of unknown characteristic with a similar electrical device of known characteristic, the combination with a source of high frequency energy, of a direct current responsive meter, a pair of circuits, each circuit including, in series with one of said devices, a resistor, a diode, and a condenser, one terminal of each of said condensers being directly connected to one another and said diodes being poled so that the commonly connected terminals assume the same charge polarity, an inductive impedance element connecting each of the meter terminals with one of the circuits at a point intermediate the diode and the condenser, a second resistor connecting the last named point in each of said circuits with a point in the other circuit intermediate the electrical device and the first named resistor, corresponding elements in each of said circuits having comparable characteristics, and means for impressing energy from said source across said circuits.

2. In apparatus for comparing an electrical device of unknown characteristic with a similar device of known characteristic, the combination with a source of radio frequency current, of a direct current responsive meter, a pair of circuits, each circuit including, in series with one of said devices and in the order named, a resistor, a rectifier, and a condenser, one terminal of each of said condensers being directly connected to one another and said diodes being poled so that the commonly connected terminals assume the same charge polarity, an inductive impedance element connecting each of the meter terminals with one of the circuits at a point intermediate the rectifier and the condenser, a second resistor connecting the said point in each of said circuits with a point intermediate the electrical device and the first named resistor of the other of said circuits, corresponding elements in each of said circuits having comparable characteristics, and means for impressing current from said source across said circuits.

3. In apparatus for comparing an electrical device of unknown characteristic with a similar electrical device of known characteristic, the combination with a source of high frequency energy, of a direct-current responsive meter, a pair of circuits, each circuit including, in series with one of said devices, a resistance device, a diode, and a condenser, one terminal of each of said condensers being directly connected to one another and said diodes being poled so that the commonly connected terminals assume the same charge polarity, a radio-frequency inductor connecting each of the meter terminals with one of the circuits at a point intermediate the diode and the condenser, a resistor connecting the last named point in each of said circuits with a point in the other circuit intermediate the electrical device and the resistance device, corresponding elements in each of said circuits having comparable characteristics, and means for impressing energy from said source across said circuits.

4. In apparatus for comparing an electrical device of unknown characteristic with a similar electrical device of known characteristic, the combination with a source of high frequency energy, of a direct-current responsive meter, a pair of series circuits, each circuit including one of said devices, a diode and a condenser, one terminal of each of said condensers being directly connected to one another and said diodes being poled so that the commonly connected terminals assume the same charge polarity, each of said meter terminals being connected with one of the circuits at a point intermediate the diode and the condenser, an impedance element connecting the last named point in each of said circuits with a point in the other circuit intermediate the electrical device and the rectifier, corresponding elements in each of said circuits having comparable characteristics, and means for impressing energy from said source across said circuits.

5. In apparatus for comparing an electrical device of unknown characteristic with a similar device of known characteristic, the combination with a source of radio frequency current, of a direct-current responsive meter, a pair of circuits, each circuit including, in series with one of said devices and in the order named, a resistance device, a rectifier, and a condenser, one terminal of each of said condensers being connected to one another and said rectifiers being poled so that the commonly connected terminals assume the same charge polarity, an inductive impedance element connecting each of the meter terminals with one of the circuits at a point intermediate the rectifier and the condenser, a resistor connecting the said point in each of said circuits with a point intermediate the electrical device and the resistance device of the other of said circuits, corresponding elements in each of said circuits having comparable characteristics, and means for impressing current from said source across said circuits.

6. In apparatus for comparing an electrical device of unknown characteristic with a similar device of known characteristic, the combination with a source of radio frequency current, of a direct-current responsive meter, a pair of series circuits, each circuit including one of said devices, a rectifier and a condenser, one terminal of each of said condensers being directly connected to one another and said rectifiers being poled so that the commonly connected terminals assume the same charge polarity, each of said meter terminals being connected with one of the circuits at a point intermediate the rectifier and the condenser, means for discharging said condensers including an impedance element connecting the said point in each of said circuits with a point intermediate the electrical device and the rectifier of the other of said circuits, corresponding elements in each of said circuits having comparable characteristics, and means for impressing current from said source across said circuits.

References Cited in the file of this patent

UNITED STATES PATENTS

| | | |
|---|---|---|
| 2,507,566 | Frisbie et al. | May 16, 1950 |
| 2,508,446 | Conant | May 23, 1950 |
| 2,593,175 | Packard | Apr. 15, 1952 |